No. 846,335. PATENTED MAR. 5, 1907.
J. McALEAR.
VALVE FOR SPRINKLER SYSTEMS.
APPLICATION FILED NOV. 18, 1905.
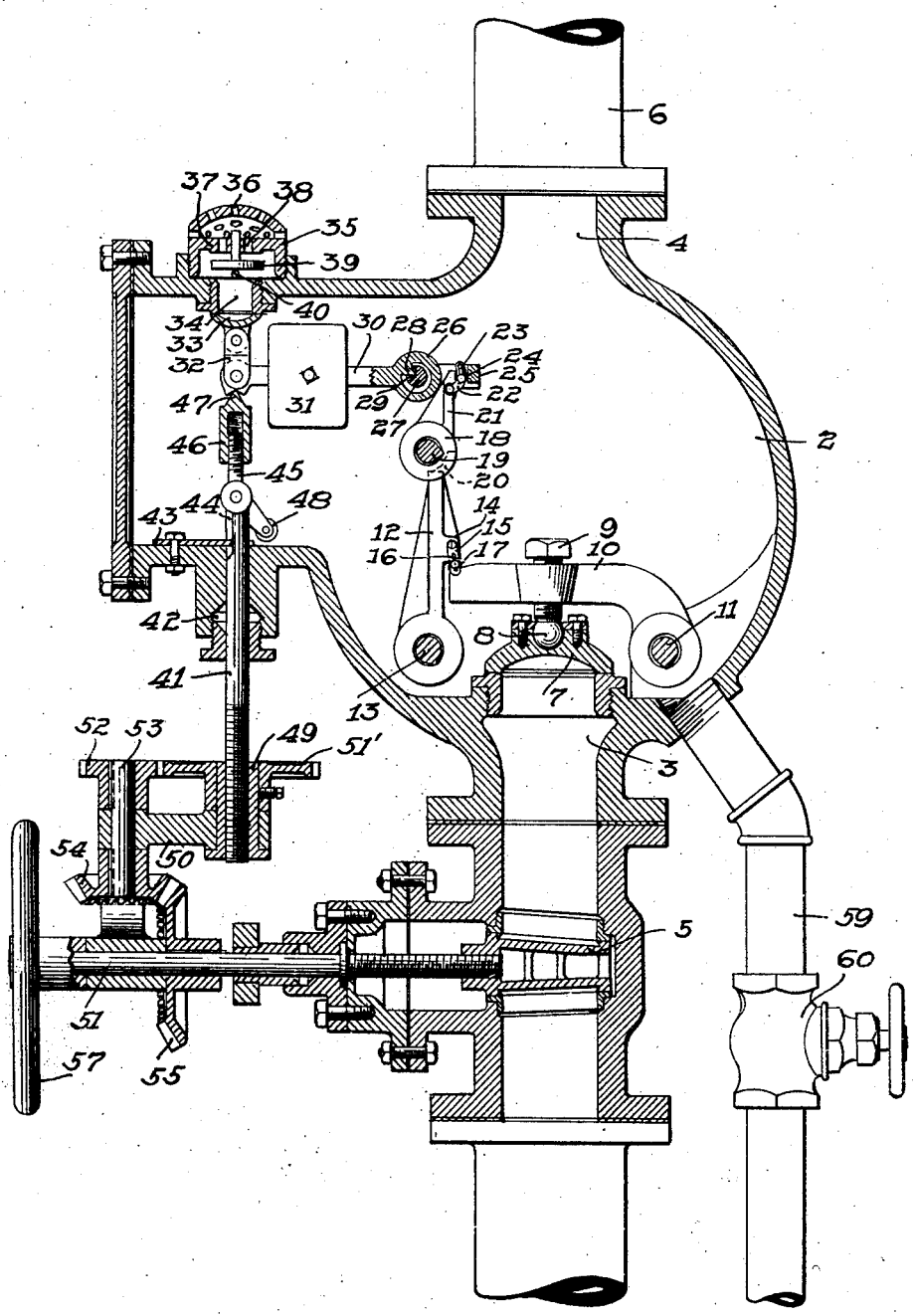
WITNESSES
INVENTOR
JAMES McALEAR.
BY
HIS ATTORNEYS

UNITED STATES PATENT OFFICE.

JAMES McALEAR, OF ST. PAUL, MINNESOTA.

VALVE FOR SPRINKLER SYSTEMS.

No. 846,335.          Specification of Letters Patent.          Patented March 5, 1907.

Application filed November 18, 1905. Serial No. 287,991.

*To all whom it may concern:*

Be it known that I, JAMES McALEAR, of St. Paul, Ramsey county, Minnesota, have invented certain new and useful Improvements in Valves for Sprinkler Systems, of which the following is a specification.

My invention relates to that class of valves used with a dry-pipe system where the pressure is admitted into the valve-casing and the main valve controlling the entrance of water to the system is locked in its closed position until such time as the pressure in the system is reduced by the opening of a sprinkler-head or through any other cause.

The object of my invention is to provide means whereby the main-valve-locking mechanism will be positively held in its locking position when adjusted and before pressure is admitted to the casing and system and surely released after pressure is admitted and when the water-inlet valve is opened.

The invention consists generally in means connected with the water-inlet valve for holding the sprinkler-valve-locking mechanism in its locked position and releasing the same when the water-inlet valve is opened.

In the accompanying drawing, forming part of this specification, the figure is a vertical sectional view of a dry-pipe sprinkler-valve embodying my invention.

In the drawing, 2 represents a casing having ports 3 and 4, connected, respectively, with the water-inlet valve 5 and the pipe 6, leading to the sprinkler system. A valve 7, which I designate the "main" valve, is arranged to close the port 3 and has a ball-and-socket connection 8 with a bolt 9, adjustably mounted in a lever 10, which is pivoted at 11 on one side of the port 3. On the other side of said port is a lever 12, pivoted at 13 and having a lug 14, provided with pivoted links 15, which have slots 16 and a roller 17 therein to bear upon the free end of the lever 10 between it and said lug. A hub 18 is pivoted on a shaft 19 and has a recess 20 to receive the upper end of the lever 12. This recess is of sufficient length to allow a limited oscillation of said hub when released. An arm 21 is provided on the hub 18 and carries pivoted links 22, having slots 23 and a roller 24 mounted therein and arranged to bear on a yoke 25, which projects horizontally from the hub 26 and between which hub and yoke the arm 21 is inserted. The hub 26 is mounted on a shaft 27 and has a lug 28 to enter a recess 29 in said shaft. The recess 29 also allows a certain degree of oscillation of the hub 26. An arm 30 projects horizontally from the hub 26 on the opposite side thereof from the yoke 25. A weight 31 is carried by said arm, and links 32 connect the end of said arm with a valve 33, designated as the "auxiliary" valve, and arranged to close a port 34, leading through the valve-casing into a cap 35, having perforations 36 and a horizontal wall 37, provided with holes 38. A valve 39 is arranged below the wall 37, being limited in its downward movement by a pin 40 and arranged when moved vertically to close the holes 38 and cut off the escape of pressure from within the cap and through the port 34. A rod 41, having a threaded lower end, is arranged to move vertically in a stuffing-box 42 in the wall of the casing, being prevented from rotating by a guide 43, fitting within a slot 44. A bell-crank 45 is pivoted on the upper end of said rod and has a cap 46 adjustably mounted on one arm and provided with a bearing-point 47, which engages the end of the arm 30 and holds the valve 33 against its seat, the adjustability of said cap allowing it to be moved up or down to properly seat the valve. The other arm of the bell-crank 45 has a roller 48, which when the rod 41 is drawn down contacts with the wall of the casing and oscillates the bell-crank to swing the cap 46 out of the path of the arm 30 and allow it to drop a sufficient distance to disengage the locking-levers and release the main inlet-valve. An interiorly-threaded sleeve 49 is mounted in a bracket 50, carried on the stem 51 of the water-inlet valve, and said sleeve is adapted to receive the lower threaded end of the rod 41. A gear 51' is secured on said sleeve and adapted to mesh with a pinion 52 on the upper end of a shaft 53, also mounted in said bracket and carrying a beveled pinion 54 on its lower end. The pinion 54 meshes with a gear 55, splined on the stem 51 of the water-inlet valve. A suitable operating-wheel 57 is provided for the stem 51. A drip-pipe 59, having a valve 60, leads downward from the bottom of the casing 2.

The lever mechanism between the main and auxiliary valves of this application is substantially the same as that shown and described in a copending application, Serial No. 287,992, filed November 18, 1905, in which the fluid-pressure in the system is excluded from the chamber wherein the lever mechanism is located, while in this application a modified form of valve is used wherein the pressure is allowed to circulate throughout the valve-casing.

In operation the main and auxiliary valves are closed and the compound-lever mechanism adjusted to lock the main valve in its closed position and the rod 41 raised to support the auxiliary valve and hold it snugly against its seat until the pressure is admitted to the system. As soon as the air enters the casing 2 and the pressure on the valve 33 becomes sufficient to neutralize the force of gravity of the valve and its weight 31 the operator will grasp the handle 57 and open the water-inlet valve, whereupon as said valve is opened the rod 41 will be lowered and the cap 49 withdrawn from contact with the arm 30 and the auxiliary valve will be held to its seat by the air-pressure in the casing. When the pressure is reduced below a predetermined point, as on the occurrence of a fire, the auxiliary valve will drop and unlock the lever mechanism and release the main valve. I thus provide a positive locking means for the auxiliary valve to hold it securely against its seat during the operation of setting the main valve and preparatory to admitting pressure to the system, and by connecting this locking mechanism with the water-inlet-valve-operating means I positively insure the release of the auxiliary valve as soon as the water-inlet valve is opened.

I claim as my invention—

1. The combination with a casing having ports for connection with the water-supply and the sprinkler system and an auxiliary port, the port leading to the system being open, of main and auxiliary valves arranged to close said supply and auxiliary ports, said auxiliary valve being normally closed by the pressure in said casing, means released by the opening of said auxiliary valve for normally locking said main valve, a manually-controlled water-inlet valve, means for positively locking said auxiliary valve in its closed position when said water-inlet valve is closed, and means connecting said locking means with said water-inlet valve whereby when said water-inlet valve is opened said locking means will be surely operated to release said auxiliary valve.

2. The combination with a casing having ports for connection with the water-supply and the sprinkler system and an auxiliary port leading to the atmosphere, of main and auxiliary valves, the former closing said supply-port and the latter said auxiliary port and being normally held in its closed position by the pressure within said casing, said sprinkler-system port being open to admit pressure to said casing, a compound-lever mechanism connecting said auxiliary and main valves and locking the latter in its closed position until said auxiliary valve is released, a water-inlet valve, means for locking said auxiliary valve in its closed position before the pressure is admitted to said casing, and a manually-operated mechanism connected with said locking means for releasing said auxiliary valve and opening said water-inlet valve, substantially as described.

3. The combination with a casing having ports for connection with the water-supply and the sprinkler system and an auxiliary port leading to the atmosphere, said sprinkler-system port being open, of main and auxiliary valves, the latter being held in its closed position by the pressure within said casing, means connecting said main and auxiliary valves and whereby the former will be held in its closed position until the latter is released, a rod for locking said auxiliary valve in its closed position while the valves are being set, a water-inlet valve having a stem and hand-wheel, and operative connections provided between said stem and said rod whereby when said inlet-valve is opened said rod will be operated to release said auxiliary valve.

4. The combination with a valve-casing having ports for connection with the water-supply and the sprinkler system and an auxiliary port, the port leading to the system being open, of main and auxiliary valves arranged to close said supply and auxiliary ports, a hub having a limited oscillating movement, an arm mounted thereon and connected with said auxiliary valve, mechanism between said hub and main valve for holding said valve in its closed position, and said mechanism being released by the oscillation of said hub when said auxiliary valve is opened to unlock said main valve, substantially as described.

5. The combination with a valve-casing having ports for connection with the water-supply and the sprinkler system and an auxiliary port, the port leading to the sprinkler system being open to admit pressure to said casing, of main and auxiliary valves arranged to close said supply and auxiliary ports, an oscillating hub, levers for locking said main valve and released by the movement of said hub, mechanism connecting said hub with said auxiliary valve and whereby the movement of said hub to release said levers is controlled by the opening of said auxiliary valve, substantially as described.

6. The combination with a valve-casing having ports for connection with the water-supply and the sprinkler system and an auxiliary port, the port leading to the system being open, of main and auxiliary valves arranged to close said supply and auxiliary ports, an oscillating hub connected with said auxiliary valve, a second oscillating hub released by the movement of said first-named hub, and mechanism released by the movement of said second-named hub for normally locking said main valve, substantially as described.

7. The combination with a valve-casing having ports for connection with the water-supply and the sprinkler system and an auxiliary port, the port leading to the system being open, of main and auxiliary valves arranged to close said supply and auxiliary ports, an oscillating hub means released by the movement of said hub for normally locking said main valve in its closed position, an arm provided on said hub and having an antifriction-bearing, a second hub having a limited oscillating movement and provided with a yoke between which and said hub said arm is inserted, and means connecting said second-named hub with said auxiliary valve and provided with a suitable weight whereby when the pressure is relieved in said casing said auxiliary valve will open and release said main valve, substantially as described.

8. The combination with a valve-casing having ports for connection with the water-supply and the sprinkler system and an auxiliary port, the port leading to the sprinkler system being open, of main and auxiliary valves arranged to close said supply and auxiliary ports, a lever pivoted at one end and arranged to bear on said main valve, a second pivoted lever having an antifriction-bearing on the free end of said first-named lever, means for locking said second-named lever in operative engagement with said first-named lever, and mechanism connecting said locking means and the auxiliary valve and whereby said locking means will be operated to release said levers and said main valve when said auxiliary valve is opened, substantially as described.

9. The combination with the valve-casing having ports for connection with the water-supply and the sprinkler system and an auxiliary port leading to the atmosphere, of main and auxiliary valves arranged to close said supply and auxiliary ports, the port leading to the system being open, a lever pivoted at one end and arranged to bear on said main valve, a second lever having an antifriction-bearing on the free end of said first-named lever, an oscillating hub having a recess to receive the free end of said second-named lever and provided with an arm, means connecting said arm with said auxiliary valve whereby when said valve is held in its closed position said hub will be prevented from rotating to release said second-named lever, substantially as described.

10. The combination with a valve-casing having ports for connection with the water-supply and the sprinkler system and an auxiliary port leading to the atmosphere, the port leading to the system being open to admit pressure to said casing, of main and auxiliary valves, the latter being held in its closed position by the pressure in said casing, a lever arranged to bear on said main valve, a second lever having an antifriction-bearing at one end on said first-named lever, an oscillating hub having a recess to receive the end of said second-named lever and provided with an upwardly-projecting arm, a shaft having a recess, a hub loosely mounted thereon and having a lug to project into said recess, a yoke mounted on said last-named hub and between which and said hub said arm is held, and an arm projecting from said last-named hub and connected with said auxiliary valve.

11. The combination with a sprinkler system, of a casing having main and auxiliary valves, the former controlling the admission of water to the system and the latter controlling the opening of said main valve, a manually-controlled water-inlet valve, means for locking said auxiliary valve in its closed position when said water-inlet valve is closed, and means whereby when said water-inlet valve is opened said locking means will be operated to release said auxiliary valve, substantially as described.

12. In a sprinkler system, the combination with main and auxiliary valves, the former controlling the admission of water to the system and the latter the opening of said main valve, a manually-controlled water-inlet valve and means whereby when said water-inlet valve is opened said auxiliary valve will be released to allow the opening of said main valve.

13. In a sprinkler system, a valve controlling the admission of water to the system, mechanism normally held by the pressure in the system to lock said valve in its closed position, a manually-controlled water-inlet valve and means actuated by the opening of said manually-controlled valve for holding said locking mechanism in its locked position and releasing the same when said manually-controlled valve is opened and pressure is admitted to the system, substantially as described.

In witness whereof I have hereunto set my hand this 9th day of November, 1905.

JAMES McALEAR.

Witnesses:
 RICHARD PAUL,
 C. MACNAMARA.